Sept. 24, 1963 W. B. ZELINA 3,105,186
HORSEPOWER LIMIT CONTROL AND FUNCTION GENERATOR THEREFOR
Filed Aug. 26, 1959 2 Sheets-Sheet 1

INVENTOR.
WILLIAM BENJAMIN ZELINA
BY Vernon F. Kalb
HIS ATTORNEY

Sept. 24, 1963  W. B. ZELINA  3,105,186
HORSEPOWER LIMIT CONTROL AND FUNCTION GENERATOR THEREFOR
Filed Aug. 26, 1959  2 Sheets-Sheet 2

INVENTOR.
WILLIAM BENJAMIN ZELINA
BY Vernon F. Kalb
HIS ATTORNEY

United States Patent Office 3,105,186
Patented Sept. 24, 1963

3,105,186
HORSEPOWER LIMIT CONTROL AND FUNCTION GENERATOR THEREFOR
William Benjamin Zelina, Erie, Pa., assignor to General Electric Company, a corporation of New York
Filed Aug. 26, 1959, Ser. No. 836,257
7 Claims. (Cl. 322—36)

This invention relates to electrical networks for imposing a desired output characteristic upon a generator, and relates more particularly to an electrical network for imposing a predetermined horsepower characteristic upon a generator in accordance with an established function.

Quite often it is necessary to control the horsepower output of a prime mover designed for a given horsepower output, because the electrical load placed upon the generator exceeds the rated capabilities of the prime mover, and the prime mover will attempt to furnish the necessary power to the generator to enable the generator to carry the electrical overload imposed thereon. Such overloading often results in stalling the prime mover, or alternatively requires the prime mover to furnish an output greater than the rated output of the prime mover, which results in rapid wear of the parts of the prime mover, which in turn adds to the maintenance and replacement parts cost of the prime mover and necessitates a shortening of the time between scheduled overhauls.

In installations where horsepower capacity of a prime mover varies widely with atmospheric conditions, it is necessary to impose a horsepower limit on the generator to protect against mechanically and/or electrically overstressing the system if the electrical load on the generator exceeds the capacity of the prime mover.

The problem of controlling horsepower output of the prime mover on electrically-driven railroad locomotive is particularly perplexing because the generator, and hence the prime mover, are continuously subjected to varying load conditions. If the prime mover is a diesel engine, its performance is affected by atmospheric conditions in addition to general engine condition. If the prime mover is a gas turbine, the horsepower capacity is greatly affected by atmospheric conditions, and it is therefore very important to closely approximate a true horsepower control of the gas turbine.

Horsepower limit controls for locomotive prime movers devised thus far have been both mechanical and electrical in nature. One mechanical system ties the horsepower limit to the fuel feed limit. In this type of system the fuel supply to the prime mover is controlled by a governor which is responsive to prime mover speed. If the electrical load on the generator increases, a demand is put on the prime mover to supply additional power to the generator. This demand is manifest by the increase in torque on the generator. The prime mover tends to lose speed, but the speed governor increases the rate of fuel feed to the governor to maintain a constant speed. The horsepower limit of the prime mover in such a system is then directly related to the fuel feed limit. When the fuel feed limit is reached and the speed of the prime mover is not sufficient to supply the demand of the generator, some provision must be made for decreasing the electrical load on the generator, otherwise the prime mover will stall. Usually electrical control means mechanically actuated are made available to remove part of the electrical load to reduce the demands of the generator. Of course, if prime mover speed indicative means are not provided to increase the rate of fuel flow to the prime mover, the prime mover will stall.

Depending on atmospheric conditions, the general condition of the prime mover and varying conditions of operation of the locomotive, the horsepower output of the prime mover may greatly exceed the rated horsepower for a particular rate of fuel feed, mechanically overstressing the prime mover and increasing wear on its parts.

Electrical horsepower limit controls usually take the form of a feedback system wherein the power output of the generator is sensed and a signal indicative of the power output is fed back into the excitation system of the generator to control the excitation of the generator in accordance with the power output thereof. Theoretically, this type of system provides accurate horsepower limit control of the prime mover; however, the problem of accurately and reliably deriving a signal proportional to horsepower is a perplexing one. Various circuit schemes have been proposed to obtain a signal indicative of the product of the current and voltage output of the generator, but none so far devised have had the necessary accuracy and continuous reliability to provide a true horsepower control or to closely approximate true horsepower control. The various circuits proposed have been rather complex for the performance desired, and have proved unstable due to variable characteristics of the circuit components with time and temperature.

In view of the aforementioned limitations and deficiencies of the prior art horsepower control systems, I have provided a horsepower control system which provides accurate horsepower control regardless of atmospheric conditions, condition of the prime mover, or conditions of operation of the locomotive. The system which is provided includes the provision of a novel electrical function network which generates a function closely approximating a desired horsepower curve of the generator.

Accordingly, it is an object of my invention to provide a horsepower control system for a prime mover driving a generator wherein the output characteristic of the generator is shaped to provide accurate horsepower control of the prime mover.

It is another object of my invention to provide a horsepower control system for a prime mover driving a generator, wherein the excitation of the generator is so controlled as to establish a horsepower characteristic for the generator which does not exceed the capacity of the prime mover.

It is still another object of my invention to provide a horsepower control system for a prime mover driving a generator wherein an electrical network generates a function closely approximating a desired horsepower characteristic of the generator and controls the excitation of the generator therewith.

It is a further object of my invention to provide a novel electrical network which generates a close approximation of a desired horsepower output characteristic of a generator.

It is a still further object of my invention to provide a simple accurate electric function network.

In achieving these and other objects in one form of my invention, I provide electric circuit means for electrically establishing a function which closely approximates a desired horsepower characteristic of a generator in response to an operating condition of the generator, together with electric circuit means for limiting the terminal voltage of the generator and the line current thereof. Signals derived from these electric circuit means in response to output conditions of the generator are compared to a predetermined reference signal and the resultant signal is applied to the excitation system of the generator to limit the horsepower output of the generator to a predetermined characteristic which places a constant horsepower demand on the prime mover. In establishing the desired function, I provide a network which yields an output signal responsive to terminal voltage of the generator in accordance with an electric function established by the network. The electric function network provides a multi-segment function wherein the slope of the function may be cause dto change so as to include an inflection point in the function.

The novel features of the invention are set forth with particularity in the appended claims. The invention itself, however, both to its organization and method of operation, together with further objects and advantages thereof, may best be understood by referring to the following description when taken in connection with the following drawings wherein:

Figure 1:
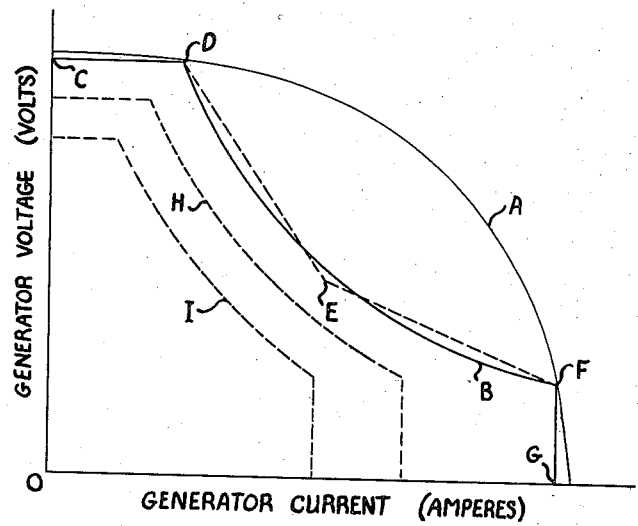
FIGURE 1 illustrates curves representative of the external characteristic of a shunt generator and the external characteristics with it is desired to impose on the generator.

Referring now to the generator characteristics of FIG. 1, I show a curve A representative of the external characteristics of a typical generator used as a power source on an electrically controlled locomotive. Curve B is a horsepower limit curve which is desired to be imposed on the generator. Portion DF of curve B represents the horsepower characteristic required of the generator to impose constant horsepower load on the prime mover. Segment CD represents the voltage to which the generator is limited, and portion FG represents the current to which the generator is limited. The generator voltage is limited to a predetermined value to avoid exceeding the dielectric strength of the generator insulation and the current is limited to protect the armature and avoid overheating. By way of illustration, the voltage limit may be 900 volts, and the current limit 3500 amperes. These values are typical of the traction generator on a diesel electric locomotive rated at 1500 horsepower. The characteristics H and I are other horsepower limit curves which may be imposed on a generator, as more fully described hereinafter. The segments CD, DE and EF comprise a function which is generated in accordance with my invention to very closely approximate the constant horsepower portion DF of the characteristic B. The constant horsepower characteristic is the product of volts and amperes and is therefore hyperbolic in form; however, due to the fact that the efficiency of the generator is less at high values of current, the horsepower curve is not made symmetrical with respect to the axis. A multiplicity of segments between point D and F may be generated and imposed on the excitation system of the generator to shape the desired characteristic. However, for ease of illustration and explanation, I hereinafter disclose a system for generating a function comprising only two segments which closely approximate the horsepower portion DF of curve B.

Figure 2:
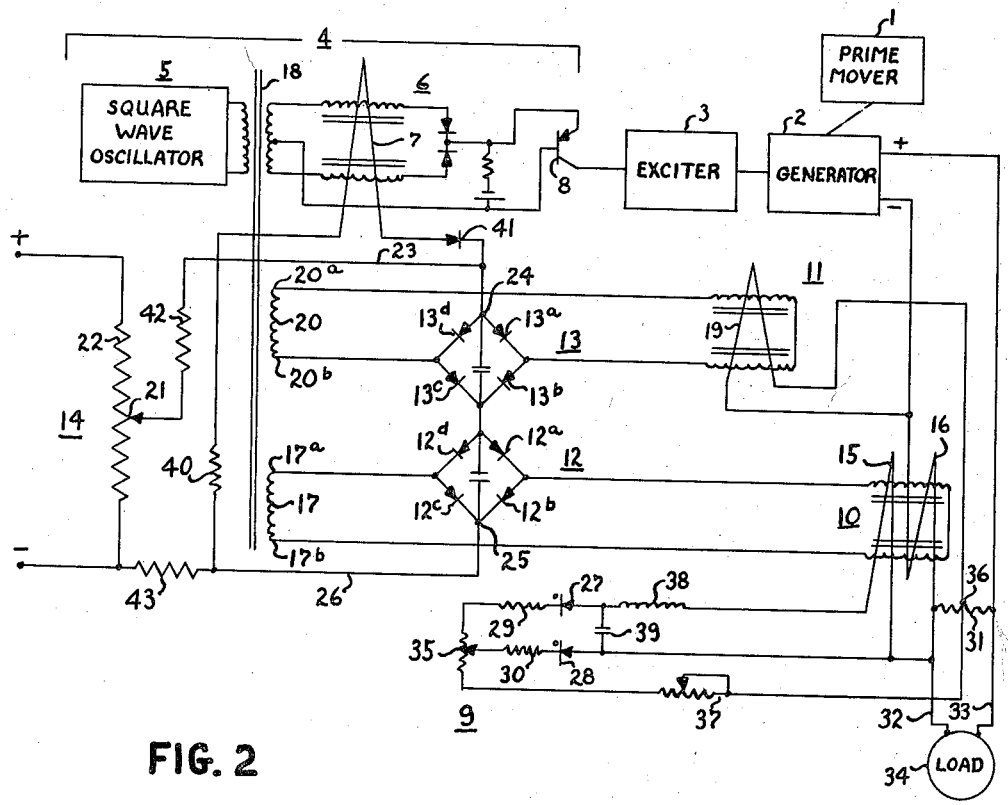
FIGURE 2 shows a generator system embodying the present invention.

Referring now to FIG. 2, I show my invention incorporated in a generator system which comprises a prime mover 1, driving generator 2, whose field is supplied by an exciter 3. The exciter 3 is supplied electrical energy by an amplifying arrangement 4 which generally comprises a square wave oscillator 5 and an amplifier network which may include a magnetic amplifier 6. The broad excitation and power system just described is well-known to those skilled in the art, and does not form any part of the present invention.

The oscillator and amplifying network 4 is preferably of the type disclosed and claimed in Patent 2,886,763, issued in my name and assigned to the assignee of the present application.

Briefly stated, the function of network 4 is as follows: The oscillator 5 supplies an alternating square wave output to magnetic amplifier 6 which includes a saturable magnetic core. The effective impedance of the magnetic amplifier is controlled by a unidirectional input signal applied to direct current (D.C.) control winding 7, which in turn controls the saturation of the magnetic core to modulate the pulse duration of the signal which passes through the amplifier. The output voltage of the magnetic amplifier is applied to a switching device such as transistor 8 whose output supplies a load. As illustrated here, the transistor 8 supplies the field of exciter 3. When used in the illustrated application, the amplifying arrangement 4 supplies a signal which may be varied in a predetermined manner in accordance with a control signal applied to D.C. control winding 7. For a detailed explanation of the structure and operation of the amplifying arrangement, reference is made to the aforementioned patent issued in my name.

In accordance with my present invention, I provide means to generate a function closely approximating the desired horsepower characteristic of the generator 2 to limit the horsepower output of the generator, and hence the demand placed on the prime mover 1. The generated function is compared with an established reference signal and then inserted into the excitation system of the generator, illustrated here as a D.C. control winding 7 on magnetic amplifier 6, to modify the excitation thereof, to yield the desired output characteristic. Depending upon the level of the reference signal, any one of a family of horsepower limit curves and characteristics may be imposed on the generator, such as the curves B, H and I of FIG. 1.

In one embodiment of my invention, I provide a function generator 9, a measuring reactor referred to as a function generator reactor 10, a voltage-measuring reactor 11, a reference mixer bridge 12, a reference mixer bridge 13, and a reference signal source 14. The function generator 9 supplies a current in accordance with a predetermined function, as hereinafter explained, to a D.C. winding 15 on the function generator reactor 10 to contribute to magnetization of the reactor core in accordance with the terminal voltage of the generator 2. The magnetic core of reactor 10 is also subject to magnetization by the output current of generator 2 by means of D.C. control winding 16 through which the generator load current passes. The magnetic flux set up in reactor 10 by current in the D.C. control windings 15 and 16 varies the effective impedance presented to an alternating rectangular wave derived from the winding 17 on transformer 18 which couples the oscillator 5 to magnetic amplifier 6. Thus the D.C. magnetization of the reactor 10 controls the alternating current (A.C.) through bridge 12 and the A.C. current through bridge 12 is thus a measure of the generator line current and the terminal voltage of the generator. The reactor 10 is preferably of the type disclosed and claimed in copending application Serial No. 659,836, filed May 17, 1957 in the names of Robert B. Bradstock and William B. Zelina, and assigned to the same assignee as this application.

Figure 3:
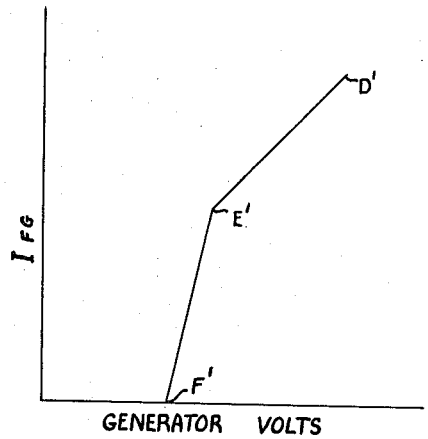
FIGURE 3 illustrates an electric function determined by an electric function network which is imposed on the excitation system of the generator to limit the horsepower output.

Reference is now made to FIG. 3 which shows the electric function established to produce a constant horsepower characteristic which is imposed on the generator 2. FIG. 3 is a plot of function generator output current versus generator voltage, and the function D'E'F' is seen to be similar in shape to the desired horsepower output characteristic DEF, FIG. 1.

The output of the function generator 9 establishes the segments D'E' and E'F'. Magnetization of reactor 10 by the line current in winding 16 on reactor 10 determines the segment FG of FIG. 1. The voltage measuring reactor 11 establishes the segment CD, FIG. 1, which represents the voltage limit of the generator. A voltage proportional to the terminal voltage of the generator is applied across D.C. winding 19 on reactor 11 and a D.C. current proportional thereto appears in the winding 19 to magnetize the core of reactor 11 and vary the effective impedance thereof. The impedance of reactor 11 controls the flow of A.C. current through rectifier bridge 13 from winding 20 of transformer 18. As now established, a current determined by the effective impedance of voltage measuring reactor 11 flows in bridge 13, and a current determined by the effective impedance of function generating reactor 10 flows in bridge 12.

The bridges 12 and 13, together with the reference source 14, comprise a reference comparison network which may be traced from tap 21 on potentiometer 22 over line 23 to point 24 in bridge 13 through point 25 in bridge 12 and over line 26 back to the low voltage side of potentiometer 22. The setting of potentiometer tap 21 determines the desired horsepower limit characteristic of the generator 2 as hereinafter explained in conjunction with a detailed description of the structure and function of the system illustrated in FIG. 2.

*Function Generating Circuit*

The function generating circuit 9 which produces current in accordance with a predetermined function in response to the terminal voltage of the generator, comprises Zener diodes 27 and 28 with associated resistors 29 and 30 respectively. The current output of the function generator 9 is applied to D.C. winding 15 on reactor 10. A voltage proportional to the terminal voltage of the generator is derived from voltage divider 31 across the output leads 32 and 33 of generator 2 which supply the output of generator 2 to a variable load which may be traction motors. A potentiometer 35 is included in the circuit to help establish the break point E' of FIG. 3. The Zener diodes 27 and 28 and their respective resistors are so proportioned in break point and resistance value respectively as to determine the current in winding 15 in response to the terminal voltage of the generator. Zener diode 27 is selected to break down at a lower value of applied voltage than is diode 28.

When the voltage at the tap 36 of voltage divider 31 reaches the value F', FIG. 3, Zener diode 27 breaks down and the current flow therethrough is determined by the applied voltage, the full resistance of potentiometer 35, resistor 29 and the resistance of winding 15, which for all practical purposes is negligible. As the voltage at tap 36 increases, the current in winding 15 increases along the line E'F', FIG. 3, until the voltage at tap 36 reaches the value E'. At this voltage level Zener diode 28 breaks down and commences to conduct current limited essentially only by a portion of the resistance of potentiometer 35 and resistor 30. This provides a shunting path about the series arrangement of resistor 29 of diode 27 and winding 15 and as the voltage at tap 36 further increases, the current in winding 15 increases along the line E'D', FIG. 3.

The variable resistor 37 may be included in the function generator circuit to help set the slopes of the desired function. The break point E' may be varied by the setting of the tap on potentiometer 35 as will be obvious to one skilled in the art. The inductance 38 and capacitance 39 may be provided to filter out any A.C. component induced in the D.C. winding 15.

From the foregoing discussion, it may be seen that the function generating circuit varies the effective impedance of reactor 10 in accordance with a predetermined function in response to the terminal voltage of the generator and hence varies the current through bridge 12 in the same manner.

*Reactors*

The effective impedance of the function generator reactor 10 is also varied by the generator current. The D.C. control winding 16, which usually is only a single turn as compared to many turns on winding 15, carries generator line current and also contributes to the control of current through bridge 12. Magnetization of the core of reactor 10 is determined by total ampere turns of windings 15 and 16 which are additive. The effective impedance of the reactor, and hence the A.C. current through the reactor, is proportional to the D.C. current in the control windings. The A.C. current in reactor 10, which is derived from winding 17, may be traced during one half cycle from 17a through diode 12c, line 26, resistor 40, D.C. winding 7, rectifier 41, bridge 13, diode 12a, reactor 10, and back to winding 17 at 17b. During the next half cycle, A.C. current flows through the reactor 10, diode 12b, to winding 7, through bridge 13, diode 12d and back to winding 17. It is to be noted that the current flow through winding 7 is always unidirectional.

The voltage measuring reactor 11 senses the terminal voltage of generator 2 and controls A.C. current derived from transformer winding 20 through bridge 13 in accordance therewith. The A.C. current through reactor 11 is proportional to the D.C. current in the control winding 19, and therefore the A.C. current through bridge 13 is proportional to the D.C. magnetization of reactor 11. The A.C. current through reactor 11 during one half cycle may be traced from winding 20 at 20a through reactor 11, diode 13b, bridge 12, resistor 40, winding 7, diode 41, diode 13d to point 20b. During the next half cycle, current flows from point 20b, through diode 13c, bridge 12, winding 7, diode 13a, reactor 11, back to winding 20 at 20a. The A.C. current through reactor 11 is always unidirectional through winding 7.

*Reference Network*

A current reference network 14 which determines the horsepower limit curve is provided. The reference network 14 comprises a potentiometer 22 connected across a source of E.M.F. and having a variable tap 21 whose setting varies the value of current in the circuit comprising resistor 42, bridge 13, bridge 12 and resistor 43. The diode 41 is so poled as to prevent current from the reference network from flowing in winding 7 to demagnetize magnetic amplifier 6.

The reference current circuit just traced may be considered a loop circuit into which two output currents of reactors 10 and 11 are introduced. The reference current establishes a bias on diode 41 which prevents current flow in winding 7 due to the output current of a reactor until a reatcor current reaches a predetermined value. When the current output of either reactor exceeds this predetermined value, an error signal is applied to winding 7 of amplifier 6, reducing the excitation of the generator to shape the generator characteristic. This characteristic of the reference circuit and the two reactor circuits is explained in detail in Patent 2,883,608, issued to Russell M. Smith, April 21, 1959, and assigned to the same assignee as the present application.

*System Operation*

Considering now the operation of the described system, assume the locomotive is accelerating from a standstill, and it is desired to hold the line current to a maximum predetermined value defined by the segment FG, FIG. 1. Maximum line current flows initially, and this line current in winding 16 of reactor 10 produces many control ampere turns. The A.C. current through the reactor 10, which increases in proportion to the line current, is compared to the reference current to derive an error current, which is applied to control winding 7 on amplifier 6 to limit the excitation of the generator in order that generator line current does not exceed the predetermined value.

As the generator voltage increases to point F, FIG. 1, the line current decreases slightly and the Zener diode 27 breaks down, supplying current to winding 15 on reactor 10 in accordance with segment F'E' of the function of FIG. 3. At this time the speed of the locomotive, and hence the speed of the traction motors, is increasing. Thus the generator line current is decreasing and the terminal voltage of the generator is increasing. The ampere turns of control winding 15 on reactor 10 are increasing in accordance with the established function.

Hence the ampere turns in winding 16 must decrease in accordance with the same function, since the regulating action of the system holds the output and therefore the net control ampere turns of reactor 10 essentially constant. The current output of reactor 10 is compared with the reference current, and an error current proportionately related to the generator output by the established function is supplied to control winding 7 to modify the excitation of the generator to impose the desired characteristic on the generator. As the speed of the locomotive further increase, the break point E' on the established function is reached and the generator output is caused to follow the segment ED, FIG. 1. When the terminal voltage reaches the value D, the ampere turns of control winding 19 on reactor 11 approach a maximum and the A.C. current through reactor 11 becomes equal to the A.C. current through reactor 10. However, as previously explained, the reactor current supplied to the reference circuit is the larger of the two reactor output currents.

As point D is passed in the direction towards point C, the output current of reactor 11 becomes controlling and modifies the excitation of the generator in the manner previously explained to establish the voltage limit segment CD.

In the explanation of the system operation, all discussion was directed to operation of the generator along the characteristic CDEFG from G to C, which is the maximum horsepower limit characteristic imposed on the generator as the locomotive accelerates from standstill to maximum speed; however, it will be apparent that the disclosed network is effective to impose the desired characteristic upon the generator as the speed of the locomotive and/or the load on the generator vary throughout the different conditions of operation of the locomotive. Additionally, the locomotive operator may select a characteristic such as B, H or I of FIG. 1 by varying the reference current by means of the tap 21 on potentiometer 22. Various horsepower limit characteristics may be imposed for various controller notches.

In the system just described, a function generator is provided which generates a function which closely approximates the essentially constant horsepower portion DEF of characteristic B. This system requires the inclusion of voltage measuring reactor 11 and bridge 13 in the system to establish the voltage limit segment CD of the characteristic B.

In order to provide a more simple, less expensive horsepower limit control, I further provide a novel electric function circuit which not only generates a function closely approximating the essentially constant horsepower portion of characteristic B, but also establishes a function having an inflection point to include within the established function a segment to set the voltage limit of the generator.

Figure 4:
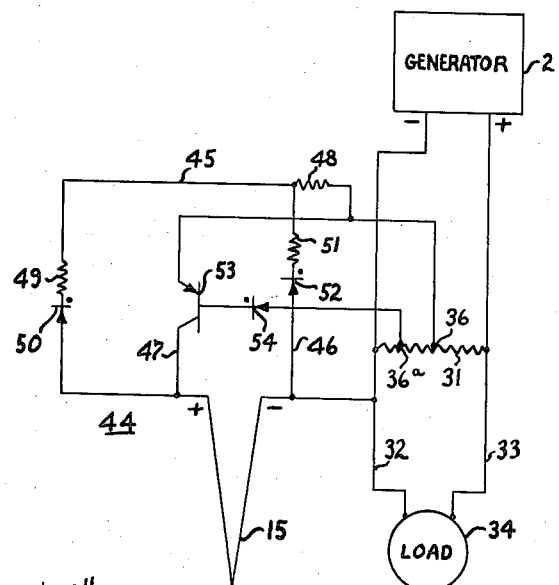
FIGURE 4 illustrates a novel electric function network which may be used in the overall system.

This novel electric function network is illustrated in FIG. 4 wherein like numerals to those used in FIG. 2 represent like elements of FIG. 2. Referring now to FIG. 4, I show generator 2 supplying an output over lines 32 and 33 to load 34. Voltage divider 31 is connected across the lines 32 and 33 and has a voltage tap at points 36 and 36a which impress voltages proportional to generator terminal voltage upon the function generator 44.

Figure 5:
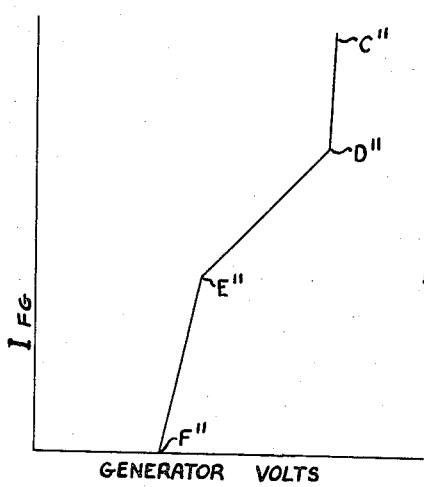
FIGURE 5 illustrates an electrical function established by the circuit of FIG. 4.

This function generator establishes the function illustrated in FIG. 5, which is a plot of output current ($I_{FG}$) of the function generator versus the voltage of generator 2. The load supplied by the function generator is the control winding 15 on reactor 10. The function generator comprises a first current path 45, a second current path 46, and a third current path 47. Although I have shown only three circuit paths which establish a three-segment function, it is to be realized of course that provision may readily be made for generating a function having more segments. Current path 45 includes resistors 48, 49, and Zener diode 50, connected to a load, control winding 15. Current path 46 includes resistors 48, 51 and Zener diode 52, and is connected to the side of the load opposite to the connection of current path 45. The third current path includes a transistor 53 connected to the same side of the load as current path 45 and having its base connected to a tap 36a on voltage divider 31 through Zener diode 54. The tap 36a on voltage divider 31 is at a lower potential than is tap 36. The function generator 44 establishes the function C"D"E"F" of FIG. 5, which is representative of curve CDEF of FIG. 1.

Considering now the operation of function generator 44 in conjunction with the function illustrated in FIG. 5, when the generator voltage increases to a value where the potential at tap 36 equals F", Zener diode 50 breaks down and current flows through path 45 into winding 15 and back to line 32 of the generator. The current flow in path 45 establishes the segment F"E". As the voltage at tap 36 further increases and reaches the value E", Zener diode 52 in path 46 breaks down and path 46 shunts path 45 and winding 15. This reduces the rate of increase of current through path 45 with terminal voltage and establishes the segment E"D" whose slope it will be noted is less than the slope of segment F"E". With further increase in potential at tap 36, which is indicative of further increase of the terminal voltage of the generator 2, the current in winding 15 follows the segment E"D". When the voltage across the emitter of transistor 53 and tap 36a reaches a predetermined value representative of the voltage at point D, FIG. 1, Zener diode 54 in the base circuit of transistor 53 breaks down and circuit path 47 essentially short circuits circuit paths 45 and 46 conducting a large current through winding 15 to establish segment CD of FIG. 1.

It is to be noted that the provision of an electric function such as that of FIG. 5, which includes an inflection point obviates the need in the previously described system of the reactor 11, bridge 13 and transformer winding 20, thus effecting considerable savings. It will be obvious to one skilled in the art that the novel function generator disclosed in FIG. 4 may have other circuit paths added to establish a function having more segments than that shown in FIG. 5. For example, another circuit path could be added on the positive side of winding 15 to insert a segment in the function of FIG. 5 between segments F"E" and E"D". Furthermore, additional circuit paths could be utilized to establish other segments after the inflection point. Additionally, if desired, the function could be made to commence at the intersection of the axes by providing a current path not including a device, such as a Zener diode, which conducts only upon application of a predetermined voltage. When the function network of FIG. 4 is used in the system, the reactor 10 and bridge 12 are retained, the function network supplying current to D.C. winding 15. The voltage measuring reactor 11, bridge 13 and associated circuitry may then be removed from the system. With the arrangement the complete characteristic CDEFG of FIG. 1 may be imposed on the generator by the output of reactor 10 in response to conditions of operation of the generator.

It is to be understood of course that the electric function network which I have disclosed in FIG. 4 is not limited to usage in the system of FIG. 2, but is adaptable to wide and diverse application.

While I have illustrated and described with particularity various embodiments of my invention, it will be obvious to one skilled in the art that various changes and modifications may be made in the disclosed examples without departing from the spirit and scope of the invention. Accordingly, it is my intention to cover all changes and modifications of the examples of the invention herein chosen for purposes of disclosure which do not constitute departures from the spirit and scope of the invention.

What I claim as new and desire to secure by Letters Patent of the United States is:

1. An arrangement for imposing an essentially constant horsepower characteristic on a generator driven by a prime mover and having an excitation system comprising, an electric circuit for establishing a plural linear segment function closely approximating the desired essentially constant horsepower characteristic, said circuit yielding an output signal in accordance with the established function in response to sensing of generator voltage and current, and means to apply the output signal to the excitation system of the generator to regulate the excitation of the generator in accordance with the function whereby the output characteristic of the generator is made to follow the desired horsepower characteristic.

2. An arrangement for imposing an essentially constant horsepower characteristic on a generator driven by a prime mover and having an excitation system comprising, an electric circuit for establishing a plural linear segment function closely approximating the desired essentially constant horsepower characteristic, said circuit yielding an output signal in accordance with the established function in response to sensing of generator voltage and current, means to compare said output signal to a horsepower limit reference signal to derive a resultant error signal and means to apply the error signal to the excitation system to regulate the excitation of the generator whereby the output characteristic of the generator is made to follow the desired horsepower characteristic.

3. An arrangement for imposing an output characteristic, having a voltage limit portion, a current limit portion and an essentially constant horsepower limit portion between the voltage and current limit portions, on a generator driven by a prime mover and having an excitation system comprising electric circuit means for establishing a plural linear segment function representative of the voltage limit portion and essentially constant horsepower portion of the characteristic, said circuit means yielding an output signal in accordance with the established function in response to sensed generator voltage and current, and means to apply the output signal to the excitation system of the generator to regulate the excitation of the generator in accordance with the function whereby the output characteristic of the generator is made to follow the desired horsepower characteristic.

4. An arrangement for imposing an output characteristic, having a voltage limit portion, a current limit portion and an essentially constant horsepower limit portion between the voltage and current limit portions, on a generator driven by a prime mover and having an excitation system comprising first electric circuit means for establishing a plural linear segment function representative of the desired essentially constant horsepower portion, second circuit means for establishing the current limit portion, third circuit means for establishing the voltage limit portion, each of said circuit means arranged to provide an excitation modifying signal to the excitation system in response to sensing of predetermined electrical operating conditions of the generator to impose the desired output characteristic on the generator.

5. Control means for predetermining the output characteristic of a generator having excitation control means and driven by a prime mover to thereby limit the power demand placed on the prime mover, comprising a saturable reactor having alternating current windings and direct current control windings thereon, said control windings adapted to effect saturation of said reactor in response to current therein whereby the impedance of said alternating windings to alternating current is proportional to current in said control windings, a first of said control windings adapted to be excited proportional to generator current, a second of said control windings being excited proportional to generator voltage, means in circuit with said second control winding for limiting the current therein at a first rate up to a predetermined value of generator voltage and at a second rate above said predetermined value, means for applying an alternating potential to said alternating current windings, means for rectifying said alternating current to thereby derive a direct current proportional to the current in said control windings following a segmented function established by said means in circuit with said second control winding and means for applying the rectified current to said excitation control means to establish a predetermined characteristic on said generator.

6. Control means for predetermining the output characteristic of a generator having excitation control means and driven by a prime mover to thereby limit the power demand placed on the prime mover, comprising a saturable reactor having alternating current windings and direct current control windings thereon, said control windings adapted to effect saturation of said reactor in response to current therein whereby the impedance of said alternating windings to alternating current is proportional to current in said control windings, a first of said control windings adapted to be excited proportional to generator current, a second of said control windings being excited proportional to generator voltage, means in circuit with said second control winding for limiting the current therein at a first rate up to a predetermined value of generator voltage and at a second rate above said predetermined value, means for applying an alternating potential to said alternating current windings, means for rectifying said alternating current to thereby derive a direct current proportional to the current in said control windings following a segmented function established by said means in circuit with said second control winding, means for providing a reference current indicative of a desired generator horsepower output, means for comparing the reference current and the rectified current and applying the resultant current to said excitation control means to establish a predetermined characteristic on said generator.

7. Control means for predetermining the output characteristic of a generator having excitation control means and driven by a prime mover to thereby limit the power demand placed on the prime mover, comprising a saturable reactor having alternating current windings and direct current control windings thereon, said control windings adapted to effect saturation of said reactor in response to current therein whereby the impedance of said alternating windings to alternating current is proportional to current in said control windings, a first of said control windings adapted to be excited proportional to generator current, a second of said control windings being excited proportional to generator voltage, current limiting means in circuit with said second control winding for limiting the current therein at a first rate up to a predetermined value of generator voltage and at a second rate above said predetermined value and means responsive to a predetermined maximum value of generator voltage for disabling said current limiting means, means for applying an alternating potential to said alternating current windings, means for rectifying said alternating current to thereby derive a direct current proportional to the current in said control windings following a segmented function established by said means in circuit with said second control winding and means for applying the rectified current to said excitation control means to establish a predetermined characteristic on said generator.

References Cited in the file of this patent

UNITED STATES PATENTS

| | | |
|---|---|---|
| 2,509,731 | Edwards et al. | May 30, 1950 |
| 2,748,278 | Smith | May 29, 1956 |
| 2,883,608 | Smith | Apr. 21, 1959 |